United States Patent [19]

Franaszek

[11] Patent Number: 4,763,122
[45] Date of Patent: Aug. 9, 1988

[54] PARALLEL SWITCHING WITH ROUND ROBIN PRIORITY

[75] Inventor: Peter A. Franaszek, Katonah, N.Y.

[73] Assignee: International Business Machines Corporation, Armonk, N.Y.

[21] Appl. No.: 28,628

[22] Filed: Mar. 18, 1987

[51] Int. Cl.[4] .............................................. H04Q 9/00
[52] U.S. Cl. ...................... 340/825.510; 340/825.790
[58] Field of Search ........... 340/825.51, 825.5, 825.87, 340/825.89, 825.79; 370/63

[56] References Cited

U.S. PATENT DOCUMENTS

| 4,331,956 | 5/1982 | Anderson | 340/825.89 |
| 4,402,008 | 8/1983 | Teraslinna | 358/86 |
| 4,581,732 | 4/1986 | Boisseau et al. | 370/63 |
| 4,605,928 | 8/1986 | Georgiou | 340/825.51 |
| 4,630,045 | 12/1986 | Georgiou | 340/825.79 |
| 4,633,394 | 12/1986 | Georgiou et al. | 340/825.51 |

*Primary Examiner*—Donald J. Yusko
*Attorney, Agent, or Firm*—Douglas W. Cameron

[57] ABSTRACT

An apparatus for parallel control of access of a number of stations to a transmission line. More specifically, this invention uses a transmission loop which intercouples a number of switches. Some of these switches, station switches, are used to indicate that a station has a request for a connection; others are used to establish priority as to when a station may gain access to a reservation processor. The reservation processor informs requesting station that when a station can close an appropriate crosspoint to gain access to a requested transmission line.

6 Claims, 6 Drawing Sheets

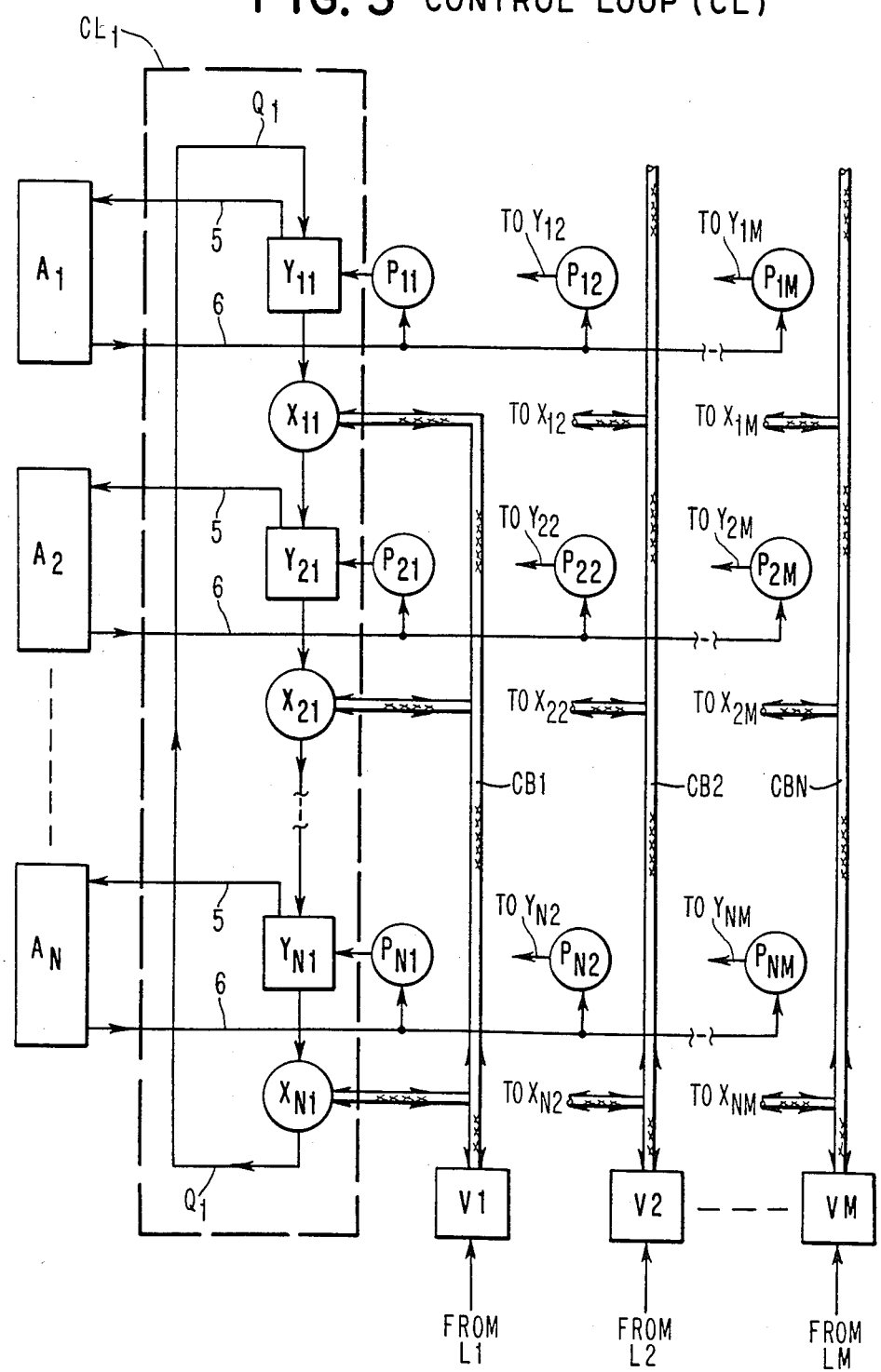
FIG. 3 CONTROL LOOP (CL)

FIG. 4.1
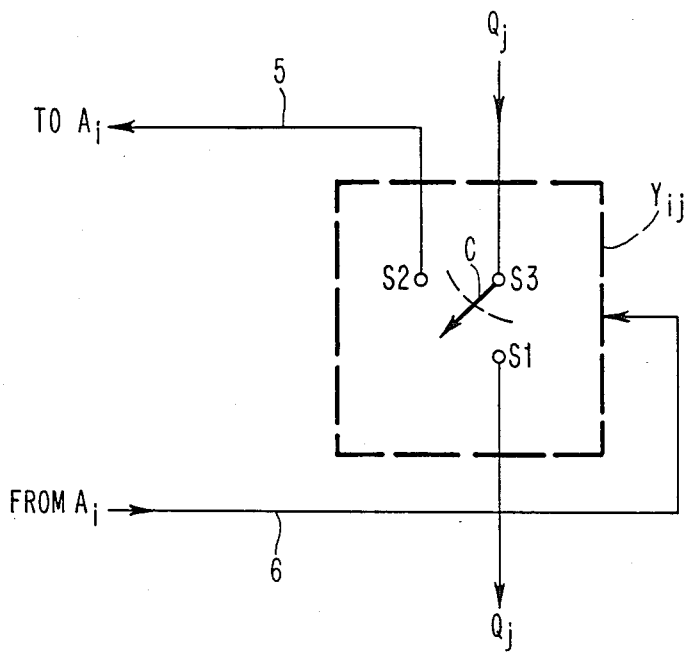
FIG. 4.2
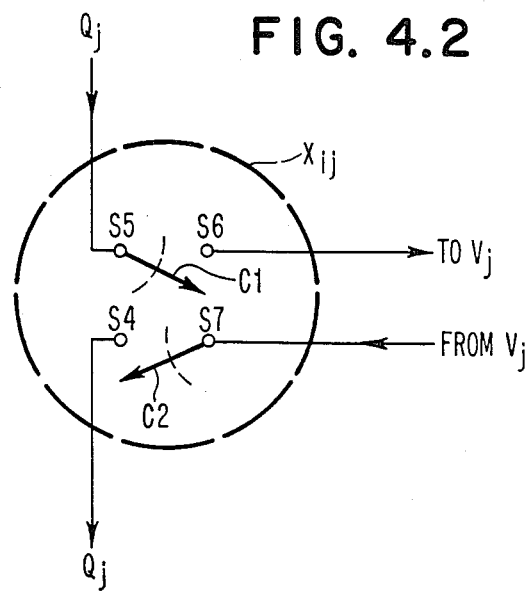

FIG. 5.1 STATION SWITCH
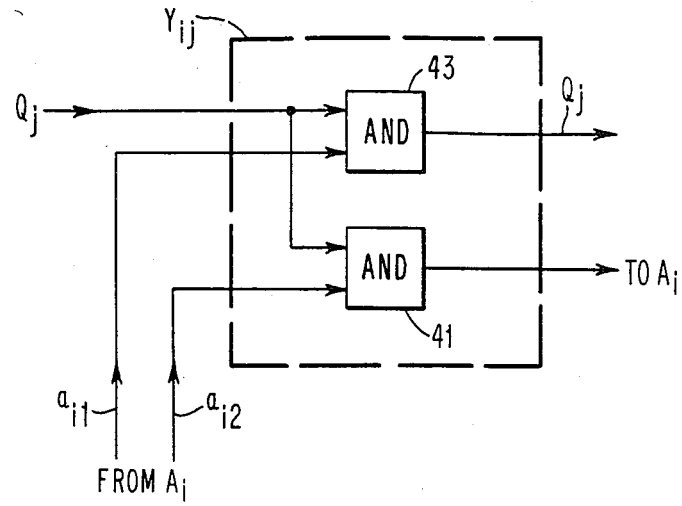
FIG. 5.2 PRIORITY SWITCH
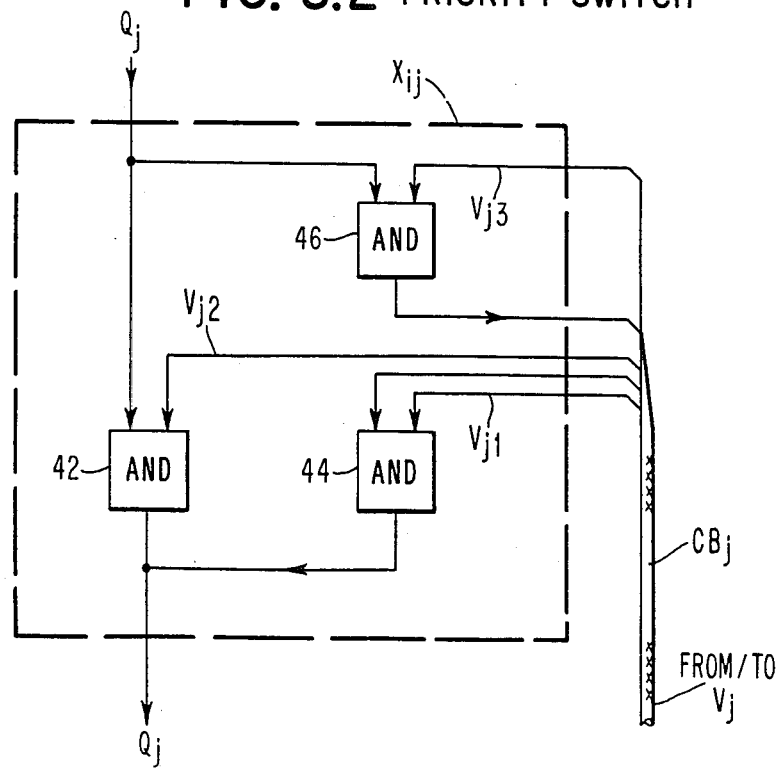

PARALLEL SWITCHING WITH ROUND ROBIN PRIORITY

DESCRIPTION

Technical Field

This invention relates to an apparatus and method for controlling access of a number of stations to a transmission line. More specifically, this invention provides for parallel control of a crosspoint switching matrix wherein a number of stations can simultaneously seek access to, or simultaneously transmit through the matrix, using a transmission loop for each transmission line or output line of the matrix.

BACKGROUND OF THE INVENTION

An often used means of selectively connecting a number of stations to respective transmission lines is through a crosspoint switching matrix. With this matrix, a station is connected to a selected transmission line by closing a specific crosspoint on the matrix. This closed crosspoint then serves to interconnect the station with the selected transmission line. To control the opening and closing of various crosspoints, a controller must be used.

Many types of controllers have been described which may be used in the crosspoint switching matrix of FIG. 1. With the advent of semiconductor crosspoint switches and the popularity of electronic switching systems, many of the recent controller designs have been implemented in integrated circuits, or a programmable computer has functioned as the controller. Examples of computerized switch controllers are given by Anderson in U. S. Pat. No. 4,331,956, by Bulfer in U.S. Pat. No. 3,935,394, and by McEowen et al in U.S. Pat. No. 4,196,316. However, almost all of these electronic switching networks have been designed for communication systems in which the switching can occur at a fairly leisurely pace because, once the interconnections have been established, the data lines remain connected to each other for substantial periods of time. However, in the case where the crosspoint switch is to be used within a computer or other computerized system and the interconnections are generally short-lived, a controller which requires a long time to establish the interconnections will severely reduce the effective bandwidth of the crosspoint switch. Alternatively stated, from the time a data line interconnection is requested until it is accomplished, no data can flow through the crosspoint switch, and accordingly, the throughput of the associated computer is reduced. Although a computerized controller will operate relatively fast, it requires a number of machine cycles to effect the connection after the service request has been made and suffers a corresponding delay. C. J. Georgiou describes in U.S. Pat. No. 4,630,045, application Ser. No. 544,653, filed Oct. 24, 1983, a controller for a crosspoint switch. A notice of allowance has been received for this application on May 27, 1986. Georgiou's controller is designed to be very fast, and only one controller is used. However, the controller must sequentially service multiple ports requesting connection through the crosspoint switching matrix. Once the demanded connection rate exceeds the speed of the controller, the throughput of the combined crosspoint switch and controller falls. Even if Georgiou's controller were redesigned to provide parallel subcontrollers, his parallel controller would nonetheless be dependent on a single table known as the port connection table. This table keeps track of available connections through the switch. Thus, the port connection table becomes a shared resource and limits the controller speed in case of high connection demand. U.S. Pat. No. 4,402,008 to K. Teraslinna describes an array of switches which are controlled by a latch which has a number of output leads connected to the switches of the array. Each output lead is connected to a particular switch of the array and is used to control the opening and closing of a particular switch.

SUMMARY OF THE INVENTION

It is, therefore, an object of the present invention to provide a controller which provides for parallel control of the crosspoints to increase the throughput of the switching matrix and controller.

Accordingly, this invention provides an apparatus for parallel control of access of a number of stations to a number of transmission lines.

A reservation processor is provided for each one of the transmission lines for generating a signal which is used to inform a selected one of the stations that it can transmit over a corresponding transmission line. More importantly, each reservation processor generates a signal, as described immediately above, in parallel with the generation of signals by other reservation processors.

Of major significance is that after the above signal is received by a station, the station itself can then close appropriate crosspoints without considering whether another station is closing one of its associated crosspoints. Closing a crosspoint gives a station access to a transmission line. Thus, we have parallel control of the crosspoints since each station controls the opening and closing of appropriate crosspoints.

With this invention there is one station switch associated with the combination of a transmission line and a station. Each station switch is used to indicate that its respective station has a request for connection to the respective transmission line. Each station switch is responsive to requests from a respective station in the form of a signal from the respective station. When the respective station switch responds to the above signal, it provides part of a path for the transmission of a signal from a corresponding reservation processor to the respective station. It should also be noted that several station switches can respond to requests from their respective stations at the same time.

Also associated with each combination of a transmission line and a station is a priority switch. This priority switch, along with other priority switches associated with a given transmission line, is used to establish priority when a number of stations request a connection to the given transmission line.

The priority switches associated with a given transmission line provide a means for establishing priority as to which station will receive a signal from a respective reservation processor when a number of stations are requesting, at the same time, connections to the given transmission line. Each priority switch is responsive to a signal generated by a corresponding reservation processor. The priority switches associated with a given transmission line also provide part of an path from a corresponding requesting station to a corresponding reservation processor.

Also provided is a transmission loop for each one of the transmission lines. Each loop intercouples a number of station switches and a number of priority switches. Each particular loop also provides at a given time, a path between any one of the stations and the reservation processing means corresponding to the particular loop. The path is also completed by a number of station switches and a number of priority switches intercoupled by the transmission loop. This path is used to send a signal generated by a respective reservation processor (as above) to a corresponding requesting station. This signal is used to inform the corresponding station that it can transmit over a corresponding transmission line.

BRIEF DESCRIPTION OF THE DRAWINGS

FIG. 3 is a more detailed schematic of a representative control loop shown in FIG. 2.

FIGS. 4.1 and 4.2 are schematics illustrating station and priority switches respectively.

FIGS. 5.1 and 5.2 are actual circuit diagrams of station and priority switches respectively.

DESCRIPTION OF THE PREFERRED EMBODIMENT

Figure 1:
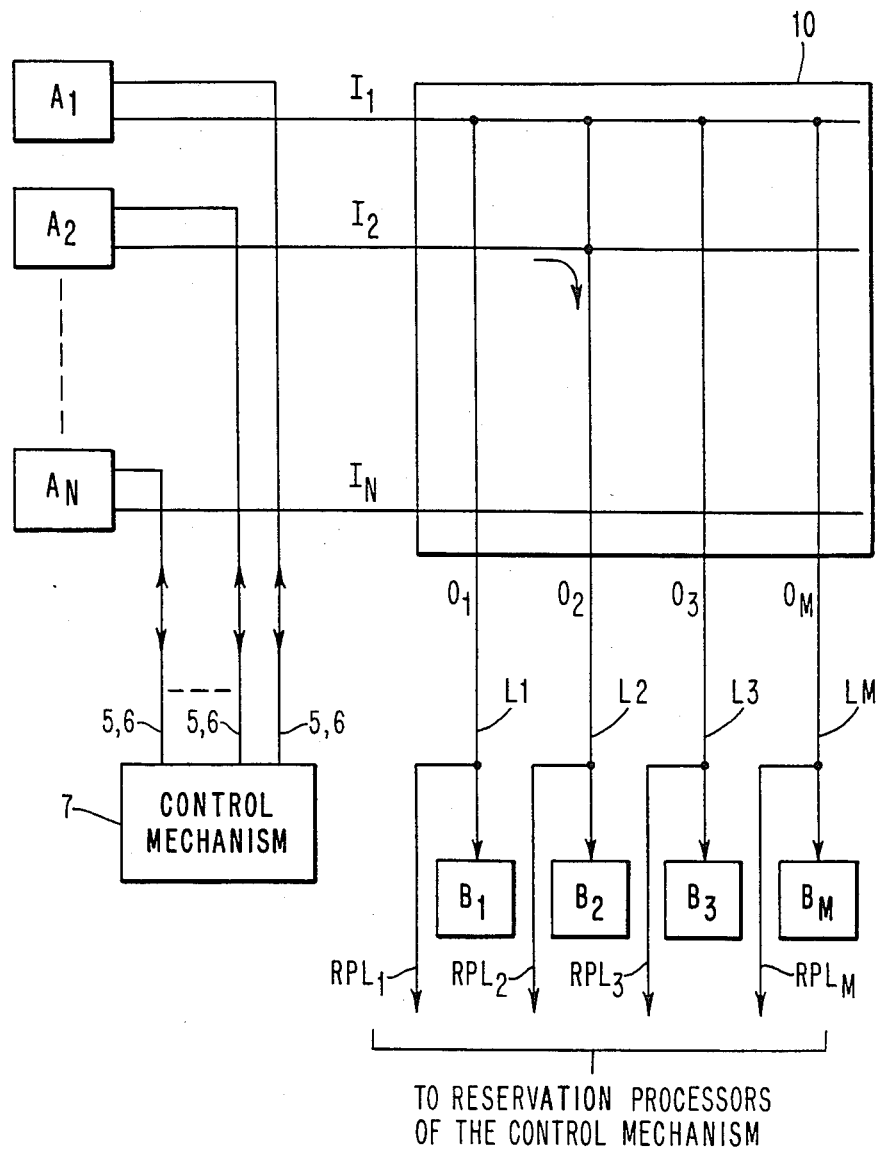
FIG. 1 shows an overall embodiment of the invention.
Figure 2:
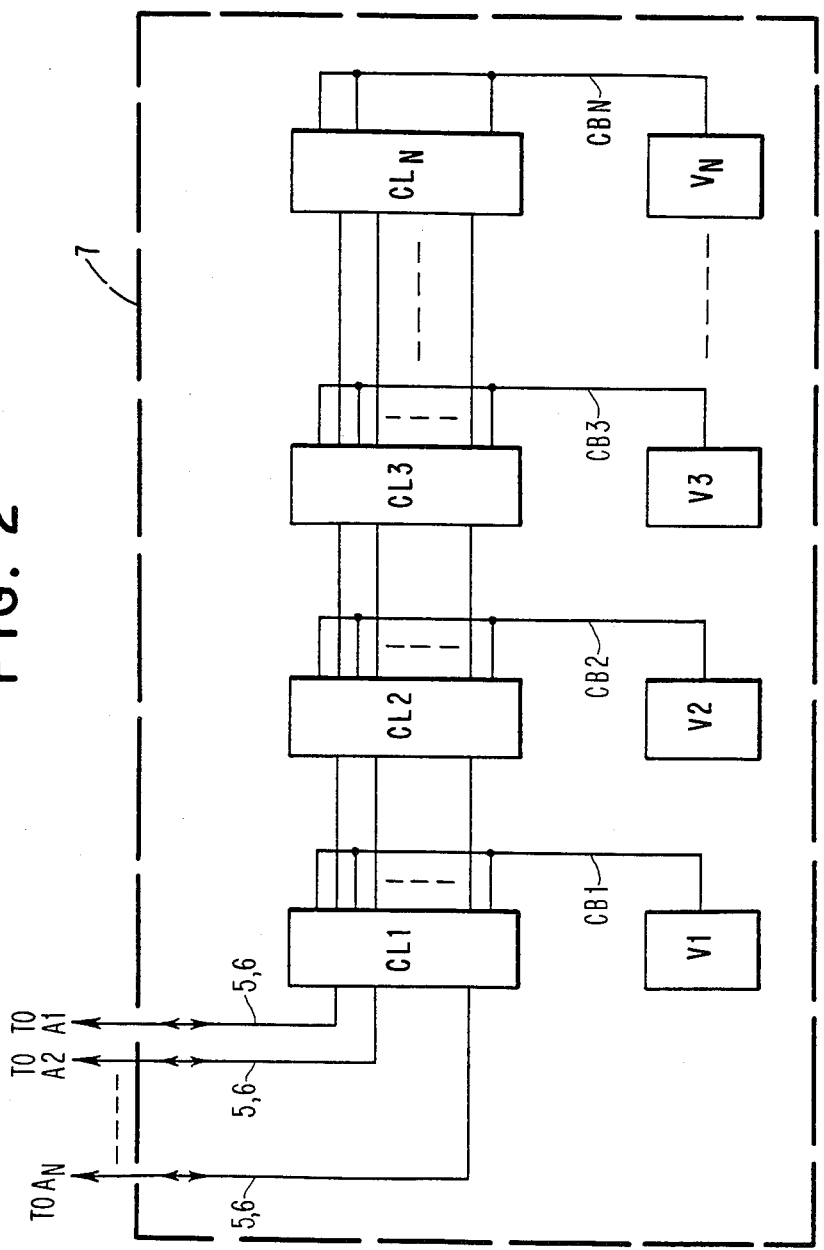
FIG. 2 shows a control mechanism of FIG. 1 in more detail.

Referring now to FIG. 1, there is shown an overall embodiment of the apparatus used to implement this invention. Shown is switching matrix 10 which is used to interconnect originating stations $A_1, A_2, \ldots, A_N$ and transmission lines $L_1, L_2, \ldots, L_M$. The inputs $I_1$ through $I_N$ of the matrix 10 are coupled to originating stations $A_1$ through $A_N$. The outputs $O_1$ through $O_M$ of the matrix 10 are coupled to transmission lines $L_1$ through $L_M$, which in turn are coupled to terminating stations $B_1$ through $B_M$ respectively as shown in FIG. 1. $L_1$, $L_2$ and $L_M$ are also coupled to $V_1$ through $V_M$ respectively of the control mechanism 7. $V_1$ through $V_M$ are reservation processors which are part of the control mechanism and are shown in FIG. 2. M is an integer generally. The crosspoints of the switching matrix are used to establish connections to respective transmission lines from the originating stations A1 through $A_N$. Throughout this application, unless otherwise specified, the term "stations(s)" shall refer to "originating stations(s)", such as $A_1$ through $A_N$. Also shown in FIG. 1 are lines $RPL_1$ through $RPL_M$ for transmitting station addresses to respective reservation processors as described below.

Shown in FIG. 2, is a more detailed schematic of the major components of the control mechanism 7 of FIG. 1. Shown are N control loops $CL_1$ through $CL_N$ which are coupled to reservation processors $V_1$ through $V_N$, respectively. Each of the control loops is also coupled to the stations $A_1$ through $A_N$, as illustrated in FIG. 2. The control loops, as well as the coupling between the control loops and the reservation processors and stations, will be shown in greater detail in FIG. 3.

Shown in FIG. 3, is a more detailed schematic of control loop $CL_1$, which is representative of all the control loops shown in FIG. 2. The interconnections of the stations $A_1, A_2, \ldots, A_N$, and the reservation processor $V_1$ to control loops $CL_1$ are also shown. The interconnection of the stations to the control loop, and the reservation processor to the control loop for the other control loops are schematically illustrated in FIG. 2, without showing the other control loops. The control loop itself comprises a transmission loop, such as Q1, and plurality of station switches $Y_{11}, Y_{21}, \ldots, Y_{N1}$, and a plurality of priority switches $X_{11}, X_{21}, \ldots, X_{N1}$. The transmission loop $Q_1$ serves to intercouple station switches and priority switches. In this embodiment the station switches and the priority switches are connected in series by the transmission loop. Notice also, that each station $A_i$ is coupled to each respective loop $Q_j$ by a corresponding switch $P_{ij}$. Each such switch ($P_{ij}$) is used so that $A_i$ can select a proper loop ($Q_j$) corresponding to the transmission line ($L_j$) requested by $A_i$.

The station switches are used to indicate which of the stations $A_1$ through $A_N$ have a request for connection to a respective transmission line. For example, the station switches $Y_{11}$ through $Y_{N1}$ are used to indicate the station having a request for connection to transmission line $L_1$. The switches $Y_{12}$ through $Y_{N2}$ indicate which stations have a request for connection to $L_2$, and so on. The station switches also provide part of a path from a corresponding requesting station to a corresponding reservation processor. (See below for details.)

Shown in FIGS. 4.1 and 4.2 are schematics to illustrate the operation of the station and priority switches, respectively. These figures are used only to illustrate the operation of these switches. The actual circuit diagrams for these switches are shown in FIGS. 5.1 and 5.2.

From FIG. 4.1, it can be seen that the station switch, for example $Y_{ij}$, can assume either of two positions. One position is the flow through position in which the switch provides a connection from one point of the loop to another point of the loop. (See $Q_j$ at points S3 and S1.) In the flow through position, contact C is in contact with contact point S1. In the other position, the non-flow through position, contact C is in contact with contact point S2. This other position provides part of the path from a reservation processor $V_j$ to station $A_i$, using loop $Q_j$. This other position is also used to indicate that station $A_i$ has a request for connection to transmission line $L_j$ corresponding to loop $Q_j$. Also shown in FIG. 4.1 are lines 5 and 6. Line 6 is used to send a signal from the associated station to the station switch to reconfigure or change the position of the switch. Line 5, on the other hand, is used to send signals from a corresponding reservation processor, through the station switch and to the associated station to notify the associated station that it can transmit over a corresponding transmission line.

Referring now to FIG. 4.2, a typical priority switch $X_{ij}$ is shown. This switch assumes either of two positions. One position is the flow through position when contact $C_1$ is in contact with contact point S4 and $C_2$ is not in contact with any of the contact points, except S7. In the flow through position, one point of the loop is connected to another point of the loop. (See S5 and S4.) In the other position, contact $C_1$ is in contact with contact point S6 and $C_2$ is in contact with contact point S4. In this other position, reservation processor $V_j$ is coupled to two ends of loop $Q_j$ at contact points S5 and S4. With the switch in this other position, the non-flow through position, and when no station makes a request for access to transmission line $L_j$, a signal will flow from $V_j$ through S7 and through S4 in a clockwise direction around the loop and return to the priority switch at point S5, through S6 and back to $V_j$. The priority switch serves to establish priority if there are several stations requesting connection to transmission line $L_j$. The first station having a request for connection, that one reaches in proceeding in a clockwise direction from priority switch $X_{ij}$ is the first station to have access to the reservation processor $V_j$. Thus, in the example shown above, the first station to have access to $V_j$ would be $A_{i+1}$, if such station had a request for connection to $L_j$. If $A_{i+1}$ had no request for connection, then $A_{i+2}$ would be the first station to have access, if such station had a request for connection to $L_j$. After station $A_N$ we would start with station $A_1$, until station $A_i$. Any station not having a request for connection is merely bypassed since the corresponding switch would be in the flow through position. If all stations are bypassed, then $V_j$ receives a signal as described above through priority switch $X_{ij}$.

Contact points S1, and S3 through S5 can also be considered points of a transmission loop such as $Q_j$.

The overall operation of the apparatus shown in FIG. 3 will now be described. First, the stations $A_1$ through $A_N$ having a request for connection to a corresponding transmission line configure the appropriate station switches to indicate that they have a request for connection to a corresponding transmission line. A station configures its switch by sending a signal to its respective station switch corresponding to the transmission line on which the station wishes to transmit. The reservation processors $V_1$ through $V_M$ select appropriate priority switches through control busses $CB_1$ through $CB_M$ and transmit a signal through the appropriate transmission loops. The signal from the reservation processor corresponding to each loop proceeds from the selected priority switch around the loop until it reaches the first station switch that indicates its associated station has a request for connection to a respective transmission line. This signal informs the associated station that it can transmit over the transmission line corresponding to the reservation processor that sent the signal. Since the signal does not return to the corresponding reservation processor, the reservation processor is informed that a station has a request for connection to the transmission loop. It is important to note that the signal passes from the selected priority switch in a clockwise direction so that the first station that the signal encounters, which indicates that it has a request for connection to the transmission loop, is the first station to be served. When the signal reaches the station, the station closes appropriate crosspoints of the switching matrix 10 to establish a connection to a requested transmission line. When the connection is established, the station then transmits data, including its address, through the crosspoints to the requested transmission line and the terminating station associated with the transmission line. The data along with the address is also transmitted to the reservation processor associated with the requested transmission line. The reservation processor then uses this address to establish priority.

The overall operation of the apparatus of this invention is best illustrated schematically by specific example. Suppose $A_1$, $A_2$ and $A_N$ simultaneously request access to transmission line $L_1$. First, $A_1$, $A_2$ and $A_N$ reconfigure the appropriate station switches $Y_{11}$, $Y_{21}$ and $Y_{N1}$ respectively. Contact C on each of these station switches is set at point S2 (see FIG. 4.1). Thus, station switches $Y_{11}$, $Y_{21}$ and $Y_{N1}$ indicate that stations $A_1$, $A_2$ and $A_N$ respectively have a request for connection to transmission line $L_1$. Now suppose further that $V_1$ selects priority switch $X_{21}$. Then referring to FIG. 4.2 contact C2 of $X_{21}$ is set at S4 and contact C1 of $X_{21}$ is set at contact point S6. A signal will be sent from $V_1$, from S7 to S4 of $X_{21}$ and through transmission loop $Q_1$ in a clockwise direction. This signal first reaches station $A_N$, which will be the first station to have access to $L_1$. $A_N$ then sends its address and data to $L_1$ which is connected or coupled to station $B_1$. The address and data are also sent to $V_1$ from $L_1$ through $RPL_1$ (see FIG. 1). The reservation processor then uses this address representing $A_N$ to set priority switch $N_1$ so that $A_N$ will have the lowest priority on the next cycle.

It is most important to note that the reservation processors, $V_1$ through $V_M$, are working in parallel with each other. That is to say, the reservation processors are working simultaneously and essentially independent of each other.

In this embodiment, for any given transmission line, the control loop, stations and reservation processors work in a cyclical fashion. Every $T_p$ seconds, the stations, which have a request for connection to a given transmission line, attempt to gain access to a transmission line. The $T_p$ cycle also contains two subcycles T1 and T2. During subcycle $T_1$, the stations having a request for connection to the given transmission line configure their associated station switches. That is, the stations requesting access to a given transmission line send signals to their associated station switches on the control loop associated with the given transmission line. The associated stations then go into the non-flow position in response to these signals. During the second subcycle $T_2$, contention among the stations is resolved and a connection from a selected requesting station to the given transmission line associated with the respective reservation processor is made as described herein. The length of the cycle $T_p$ can be made to vary from cycle to cycle according to the length of the message transmitted by the selected requesting station. The method of varying this length, as above, would be obvious to one skilled in the art.

As described, in the above, the reservation processors ($V_1$ through $V_M$) each periodically send signals to the stations ($A_1$ through $A_N$) requesting access to a transmission line, and set priority switches in response to addresses transmitted from the stations. Any suitable computer processor can be used to carry on all of the functions of the reservation processor described herein.

Shown in FIG. 5.1 is a more detailed circuit diagram of the schematic station switch illustrated in FIG. 4.1. The station switch $Y_{ij}$ shown in FIG. 5.1 is the station switch associated with combination of station $A_i$ and transmission line $L_j$. All the other station switches are similar to the one shown in this figure. Lines $a_{i1}$ and $a_{i2}$ correspond to line 6 of FIG. 4.1. When the station switch is to be in the flow through position a "high" or "1" appears $a_{i1}$ and a "low" or "0" appears on line $a_{i2}$. A "high" on $Q_j$ would appear on one of the inputs of AND gates 41 and 43. Thus, a "high" on $Q_j$ would also appear on the output of AND gate 43. That is, a "high" would just be passed from one part of transmission loop $Q_j$ to another part of transmission loop $Q_j$ through station switch $Y_{ij}$ when it is in the flow through position. In the other position, the non-flow through position, $a_{i1}$ is "0" and $a_{i2}$ is "1". Thus, when the station switch is in this other position a "high" on $Q_j$ flows through AND gate 41 on line 5 to station $A_i$. In this other position, station $A_i$ indicates that it has a request for connection to transmission line $L_j$.

Shown in FIG. 5.2 is a more detailed circuit diagram for the priority switch which is schematically illustrated FIG. 4.2. The priority switch shown is the priority switch associated with station $A_i$ and transmission line $L_j$. The priority switch shown is controlled through control bus $CB_j$ from reservation processor $V_j$. As described above, the priority switch has two positions. In the flow through position $v_{j1}$ and $v_{j3}$ are set at "0" or "lows" and $v_{j2}$ is set at a "high" or "1". Thus, a "high" flows from $Q_j$ through AND gate 42 back onto $Q_j$. In the other position, the non-flow through position, $v_{j1}$ and $v_{j3}$ are set at a "high" or "1" and $v_{j2}$ is set at a "0" or "low". Thus, in this other position, a "high" or a "1" from $V_j$ and on control bus $CB_j$ flow through AND gate 44 and onto loop $Q_j$. Also, in this other position, if no station were requesting access to transmission line $L_j$, the signal above would be transmitted around the loop $Q_j$, through AND gate 46 and back to reservation processor. Thus, in this other position, the priority switch would allow a "high" from control bus $CB_j$ to pass onto to the loop in a clockwise direction to the first station along the loop in this clockwise direction that had set its associated station switch to indicate that it has a request for transmission on transmission loop $L_j$. The actual flow of the high signal from the reservation processor is more easily seen from an examination of FIG. 4.2. With contact C1 set at contact point S6 and contact C2 set at contact point S4.

Figure 6:
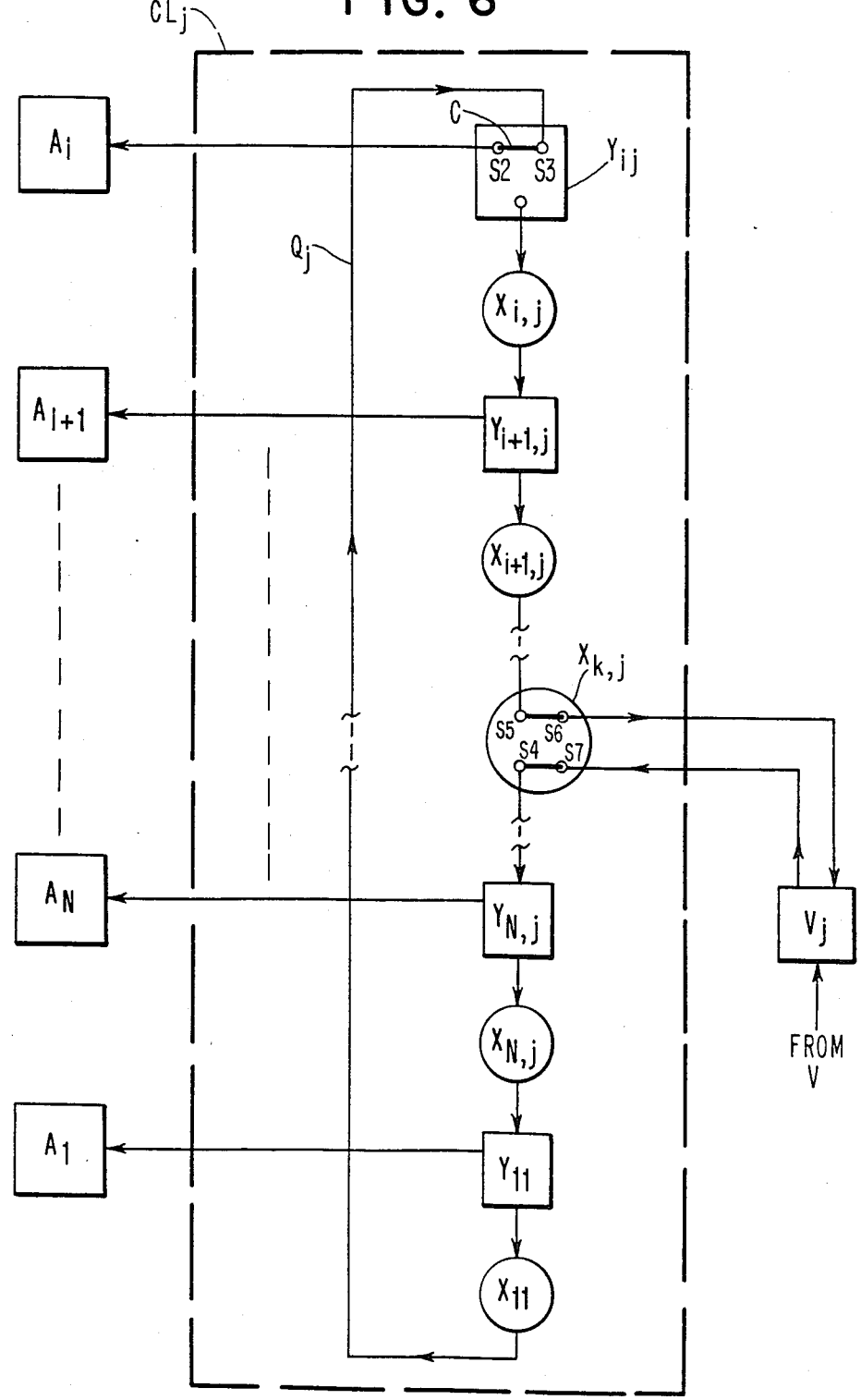
FIG. 6 is a schematic illustrating a circuit path including station and priority switches to a corresponding requesting station Ai from a corresponding reservation processor Vj.

Shown in FIG. 6 is a path to a corresponding requesting station $A_i$ from a corresponding reservation processor $V_j$. Notice that all of the priority switches are in the flow through position, except for priority switch $X_{k,j}$. Also, all of the station switches, except for $Y_{i,j}$ and $Y_{i+1,j}$ are in the flow through position. Thus, the path starts at $V_j$, passes through S7 and S4 of priority switch $X_{k,j}$, through a number of station and priority switches that are in the flow through position, and finally through S3 and S2 of station switch $Y_{ij}$ to $A_i$. Notice also from FIG. 6 that the station switches and the priority switches provide part of the path from a corresponding requesting station to a corresponding reservation processor.

Having thus described my invention, what I claim as new, and desire by Letters Patent is:

1. In a network of a plurality of stations and a plurality of transmission lines, an apparatus for parallel control of access of the stations to the transmission lines, comprising:
   (a) a reservation processing means, for each one of the transmission lines, for generating a signal which is used to inform a selected one of the stations that it can transmit over a corresponding one of the transmission lines;
   (b) station switch means for each one of the transmission lines, each of the station switch means being responsive to requests from the stations to transmit on a corresponding one of the transmission lines, each of the station switch means being used to provide part of a path for the signal generated in step (a) to be transmitted from a corresponding one of the reservation processing means to the selected one of the stations requesting to transmit on a corresponding one of the transmission lines;
   (c) priority switch means, for each one of the transmission lines, for establishing priority as to which one of the stations will be selected to receive the signal generated in step (a), the one station being selected from stations requesting to transmit on a corresponding one of the transmission lines, the priority switch means being responsive to signals from a corresponding reservation processing means; and
   (d) a transmission loop means for each one of the transmission lines, each loop intercoupling the station switch means and the priority switch means corresponding to one of the transmission lines, each loop, along with corresponding station and priority switch means, being used to provide a path from a corresponding one of the reservation processors to a corresponding selected one of the stations requesting to transmit on a corresponding one of the transmission lines, the path being used for the transmission of a corresponding signal of the signals generated in step (a) from a corresponding reservation processor to a corresponding station.

2. An apparatus as recited in claim 1, wherein the station switch means comprises a plurality of station switches.

3. An apparatus as recited in claim 1, wherein the priority switch means comprises a plurality of priority switches.

4. In a network of a plurality of stations and a plurality of transmission lines, an apparatus for parallel control of access of the stations to the transmission lines, comprising:
   (a) a plurality of station switches, each station switch being associated with a particular combination of one of the stations and one of the transmission lines, each station switch capable of assuming a non-flow through position in response to a signal received from an associated station, the non-flow through position indicating that the associated station has a request to transmit on a respective one of the transmission lines;
   (b) a plurality of priority switches each priority switch being associated with a particular combination of one of the stations and one of the transmission lines, each priority switch capable of assuming a non-flow through position in response to a signal received, wherein the position, of each of the priority and station switches in combination with the position of other of the priority and station switches, is used to establish an order of priority among the stations as to which one of the stations is to be allowed to transmit on an associated transmission line at a given time, the position of the priority and station switches being either a flow through or a non-flow through position;
   (c) a reservation processing means for each one of the transmission lines for generating signals used to inform a selected one of the stations that it can transmit over a corresponding one of said transmission lines, the reservation processing means also being used to transmit the signal received in step (b) by at least one of the priority switches which assumes the non-flow through position in response thereto;
   (d) a transmission loop for each one of the transmission lines, there being intercoupled by each loop, one of the station switches and one of the priority switches for each one of the stations, each loop being used to provide, at any one time when at least one of the stations has a request for connection to a corresponding one of the transmission lines, a path for the transmission of a signal, generated by a corresponding reservation processor as in step (b), the path being between a corresponding one of the stations, selected as in step (c), and a corresponding one of the reservation processing means, the signal, referred to in this step, being transmitted from a corresponding one of the reservation processor, along a corresponding path, starting from a corresponding one of the priority switches in the non-flow through position, through corresponding ones of the station and priority switches in the flow through position and through a station switch in a non-flow through position to a corresponding one of the stations, which corresponding station is thereby informed that it can transmit over a corresponding one of the transmission lines.

5. An apparatus as recited in claim 4, further comprising:
a switching matrix, the inputs of the matrix being coupled to the stations and the outputs of the matrix being coupled to the transmission lines, the crosspoints of the matrix being used to establish connections to respective transmission lines from the stations by closing corresponding crosspoints, the connections being established to one transmission line requested for connection in parallel with connections being made to other transmission lines requested for connection.

6. In a network of a plurality of stations and a plurality of transmission lines, an apparatus for parallel control of access of the stations to the transmission lines, comprising:
(a) a plurality of station switches, each station switch being associated with a particular combination of one of the stations and one of the transmission lines, each station switch capable of assuming a non-flow through position in response to a signal received from an associated station, the position indicating that the associated station has a request to transmit on a respective one of the transmission lines;
(b) a plurality of priority switches each priority switch being associated with a particular combination of one of the stations and one of the transmission lines, each priority switch capable of assuming a non-flow through position in response to a signal received, wherein the position, of each of the priority and station switches in combination with the position of other of the priority and station switches, is used to establish an order of priority among the stations as to which one of the stations is to be allowed to transmit on an associated transmission line at a given time, the position of the priority and station switches being either a flow through or a non-flow through position;
(c) a reservation processing means for each one of the transmission lines for generating signals used to inform a selected one of the stations that it can transmit over a corresponding one of said transmission lines, the reservation processing means also being used to transmit the signal received in step (b) by at least one of the priority switches which assumes the non-flow through position in response thereto;
(e) a switching matrix, the inputs of the matrix being coupled to the stations and the outputs of the matrix being coupled to the transmission lines, selected ones of the stations being connected to selected ones of the transmission lines by closing corresponding crosspoints, the selected ones of the stations being stations that were informed, as in step (d), that they could transmit over corresponding ones of the transmission lines, the connections being established to one of the corresponding transmission lines requested for connection in parallel with connections being made to other of the corresponding transmission lines requested for connection.

* * * * *